United States Patent
Dürr et al.

(10) Patent No.: US 10,529,514 B2
(45) Date of Patent: Jan. 7, 2020

(54) OVERLOAD RELEASE, IN PARTICULAR FOR A CIRCUIT BREAKER

(75) Inventors: Andreas Dürr, Amberg (DE); Xaver Laumer, Schorndorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 662 days.

(21) Appl. No.: 14/117,493

(22) PCT Filed: Jun. 20, 2012

(86) PCT No.: PCT/EP2012/061869
§ 371 (c)(1),
(2), (4) Date: Nov. 13, 2013

(87) PCT Pub. No.: WO2013/004505
PCT Pub. Date: Jan. 10, 2013

(65) Prior Publication Data
US 2014/0333410 A1  Nov. 13, 2014

(30) Foreign Application Priority Data
Jul. 5, 2011 (DE) .................. 10 2011 078 634

(51) Int. Cl.
*H01H 37/52* (2006.01)
*H01H 37/34* (2006.01)

(52) U.S. Cl.
CPC ............ *H01H 37/34* (2013.01); *H01H 37/52* (2013.01); *H01H 2037/525* (2013.01)

(58) Field of Classification Search
CPC .. H01H 37/34; H01H 37/52; H01H 2037/525; H01H 2037/528; H01H 71/164; B23K 9/167
USPC ........................................................ 337/377
See application file for complete search history.

(56) References Cited

U.S. PATENT DOCUMENTS

| | | | | |
|---|---|---|---|---|
| 1,996,721 A | * | 4/1935 | Gibbs | G01K 5/66 374/E5.039 |
| 3,102,793 A | | 9/1963 | Alban | |
| 3,168,804 A | * | 2/1965 | Quinn | H01H 61/013 337/107 |
| 3,674,952 A | * | 7/1972 | Ellenberger | D06F 37/42 200/61.64 |

(Continued)

FOREIGN PATENT DOCUMENTS

| CN | 1033514 A | 6/1989 |
|---|---|---|
| DE | 1588474 B | 11/1970 |

(Continued)

OTHER PUBLICATIONS

Strympe, DE 2455856 A1, Translated Description.*

(Continued)

*Primary Examiner* — Jacob R Crum
(74) *Attorney, Agent, or Firm* — Harness, Dickey & Pierce, P.L.C.

(57) ABSTRACT

An overload release is disclosed, in particular for a circuit breaker, including a metal strip which is made of at least two different types of metal and around which a heat conductor is wound, wherein an electrical insulator is arranged between the metal strip and the heat conductor. In an embodiment, the heat conductor is welded onto the metal strip by way of arc welding.

14 Claims, 2 Drawing Sheets

(56) References Cited

U.S. PATENT DOCUMENTS

| | | | |
|---|---|---|---|
| 4,691,184 A | 9/1987 | Wulff | |
| 4,736,174 A | 4/1988 | Castongugy | |
| 4,868,366 A | 9/1989 | Joseph et al. | |
| 5,103,202 A * | 4/1992 | Lennon | H01H 77/04 337/100 |
| 5,240,965 A | 8/1993 | De Vos et al. | |
| 5,497,936 A | 3/1996 | Vojta et al. | |
| 5,847,937 A | 12/1998 | Cepa et al. | |
| 2010/0060406 A1 | 3/2010 | Kim et al. | |
| 2010/0126969 A1 * | 5/2010 | Klangos | B23K 9/167 219/75 |

FOREIGN PATENT DOCUMENTS

| | | |
|---|---|---|
| DE | 2063535 A1 | 7/1972 |
| DE | 002455856 A1 * | 6/1975 |
| DE | 3435228 A1 | 4/1986 |
| DE | 3812950 A1 | 11/1988 |
| DE | 4336000 A1 | 10/1993 |
| DE | 19646003 C1 | 11/1997 |
| EP | 0651407 A1 | 5/1995 |
| EP | 0780021 A1 | 6/1997 |
| GB | 1230398 A | 4/1971 |
| JP | 8153451 A | 8/1996 |
| JP | 2000351078 A | 12/2000 |
| JP | 2009540522 A | 11/2009 |
| KR | 1019950013424 B1 | 11/1995 |

OTHER PUBLICATIONS

Chinese Office Action and English translation thereof dated Apr. 29, 2015.
Korean Office Action dated Feb. 23, 2015 for corresponding KR Application No. 10-2014-7003062.
International Search Report PCT/ISA/210 for PCT/EP2012/061869 dated Oct. 17, 2013.
Written Opinion PCT/ISA/237 for dated for PCT/EP2012/061869 dated Oct. 17, 2013.
German Search Report for DE 10 2011 078 634.1 dated Feb. 10, 2012.

* cited by examiner

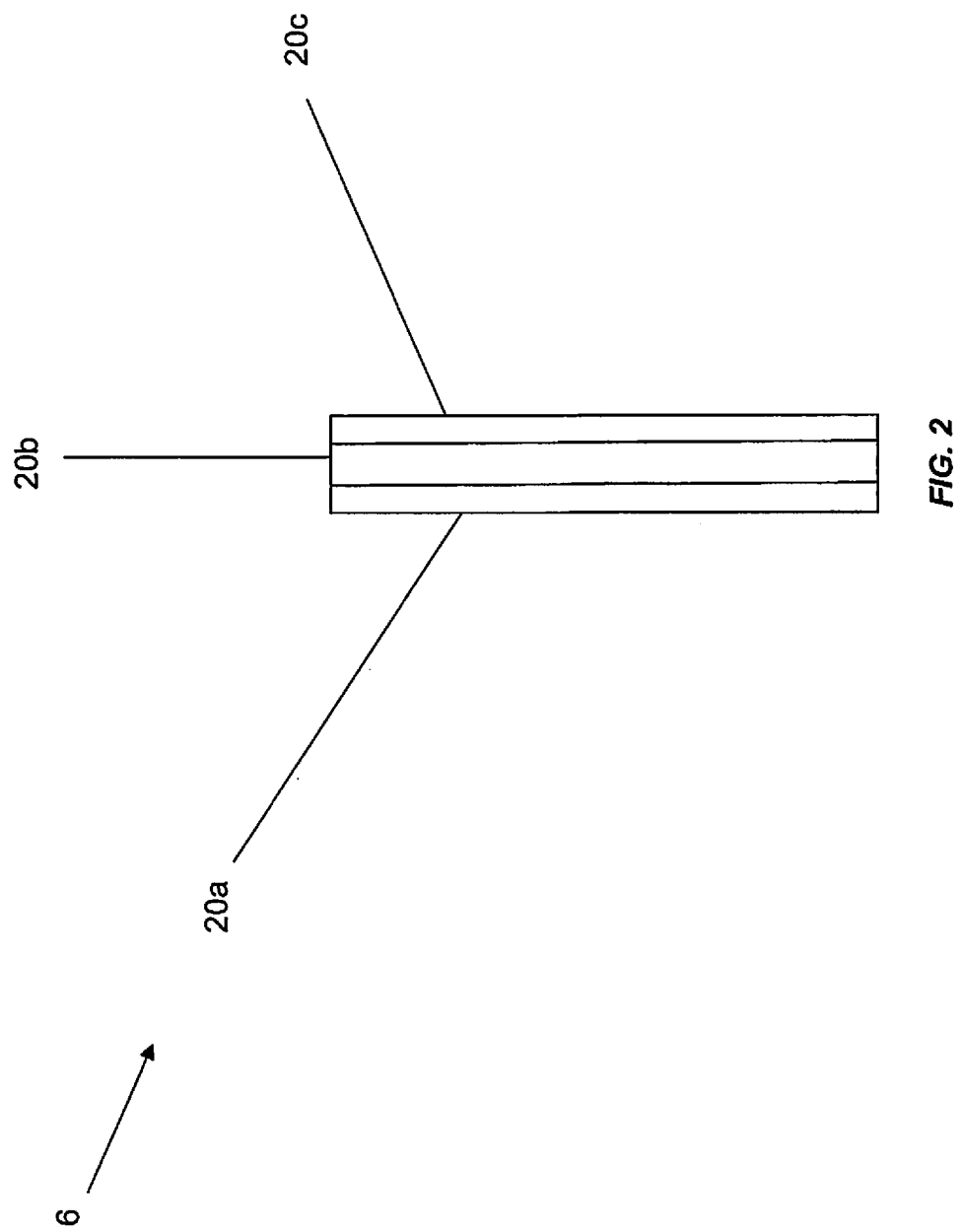

OVERLOAD RELEASE, IN PARTICULAR FOR A CIRCUIT BREAKER

PRIORITY STATEMENT

This application is the national phase under 35 U.S.C. § 371 of PCT International Application No. PCT/EP2012/061869 which has an International filing date of Jun. 20, 2012, which designated the United States of America and which claims priority to German patent application number DE 10 2011 078 634.1 filed Jul. 5, 2011, the entire contents of each of which are hereby incorporated herein by reference.

FIELD

At least one embodiment of the invention generally relates to an overload release, in particular for a circuit breaker. In particular, it relates to one including a metal strip which is made of at least two different types of metal and around which a heating conductor is wound, wherein an electrical insulator is arranged between the metal strip and the heating conductor.

BACKGROUND

In electromechanical protective devices, in particular in circuit breakers, bimetal or trimetal strips are used as overload releases. In order to achieve the desired release characteristics, the metal strips generally have either a heating winding or a heating pack.

Heating windings are metal wires or bands that are wound around the bimetal strip. Between the bimetal strip and the heating winding there is an electrical insulator, for example a glass-fiber fabric, in order to prevent a short-circuit of the individual heating conductor windings to the bimetal strip. At the upper end of the bimetal strip, the heating conductor and the bimetal are welded to one another.

Heating packs comprise a metal band that is folded into the form of a pack and fastened to the bimetal strip. Between the individual folds there is an electrical insulator, such as for example mica flakes, so that current flows through the metal band of the heating pack in its entire length. In the case of bimetal or trimetal strips with a heating winding, current flows through the bimetal. By contrast, in the case of bimetal strips with a heating pack, generally no current flows through the bimetal. The heating pack with current flowing through it only heats the bimetal indirectly. Therefore, no feeding between the heating pack and the bimetal is required here.

The production costs for wound bimetal strips are lower than for packeted bimetal strips. The reason for this is the easier automatability, the lower material requirement and the easier integration, from a technical installation and welding viewpoint, of the wound bimetal strip in the current path of the associated device. For this reason, it is endeavored to use wound bimetal strips with preference.

However, the use of wound bimetal strips especially reaches its limits in the weldability of the required bimetal and heating conductor materials. Here, the resistance forge welding method is used. While those materials that are used in protective devices of low setting ranges can be welded relatively well, the weldability of materials that are required for high setting ranges decreases greatly. Therefore, wound bimetal strips are found predominantly in devices with low setting ranges. Packeted bimetal strips are used in devices with higher setting ranges.

If it were technically possible for welding also to be used for connecting the materials that are required in the case of bimetal strips for high setting ranges, wound bimetal strips could take the place of many types of packeted bimetal strip. This would achieve a reduction in the production costs.

The problems that arise in the resistance forge welding of materials that are required in bimetal strips for high setting ranges are often avoided by using packeted bimetal strips. In that case, however, the higher production costs have to be accepted. Furthermore, it is attempted to push the limit of the setting range for which wound bimetal strips can still be used up as far as possible by refining the resistance forge welding method. Measures in this direction are, for example, that of replacing the alternating-current technique for the welding current sources by a direct current technique (inverter) that can be regulated with better control, that of using better materials for the welding electrode or controlled welding tongs with a servo drive (motor head) and integrated monitoring of the welding force, moving-on movement and moving-on displacement. Further measures are that of reworking welding spatter that occurs, increased inspection of the as-welded strength of samples from destructive testing or else the acceptance of low electrode lifetimes (for example 200 welding operations). In addition, the heating windings are often dimensioned such that a welded area of 50% of the heating conductor cross section is sufficient to carry the current. This causes greater use of material, and consequently higher costs. It also has to be taken into consideration that, in the case of material combinations that are difficult to weld, welded areas of 100% of the current-carrying heating conductor cross section cannot be produced in practice by the resistance forge welding method.

SUMMARY

At least one embodiment of the present invention is directed to an overload release, in particular for a circuit breaker, including an optimized connection between the metal strip and the heating conductor in the case of higher setting ranges.

Advantageous forms and developments, which can be used individually or in combination with one another, are the subject of the dependent claims.

According to an embodiment of the invention, an overload release, in particular for a circuit breaker, includes a metal strip which is made of at least two different types of metal and around which a heating conductor is wound, wherein an electrical insulator is arranged between the metal strip and the heating conductor. An embodiment of the invention is in this case distinguished by the fact that the heating conductor is welded onto the metal strip by means of arc welding.

BRIEF DESCRIPTION OF THE DRAWINGS

Further advantages and embodiments of the invention are explained below on the basis of an example embodiment and on the basis of the drawing.

Schematically:

FIG. 2 shows a cross-section of a metal strip illustrated in FIG. 1.

DETAILED DESCRIPTION OF THE EXAMPLE EMBODIMENTS

Figure 1:
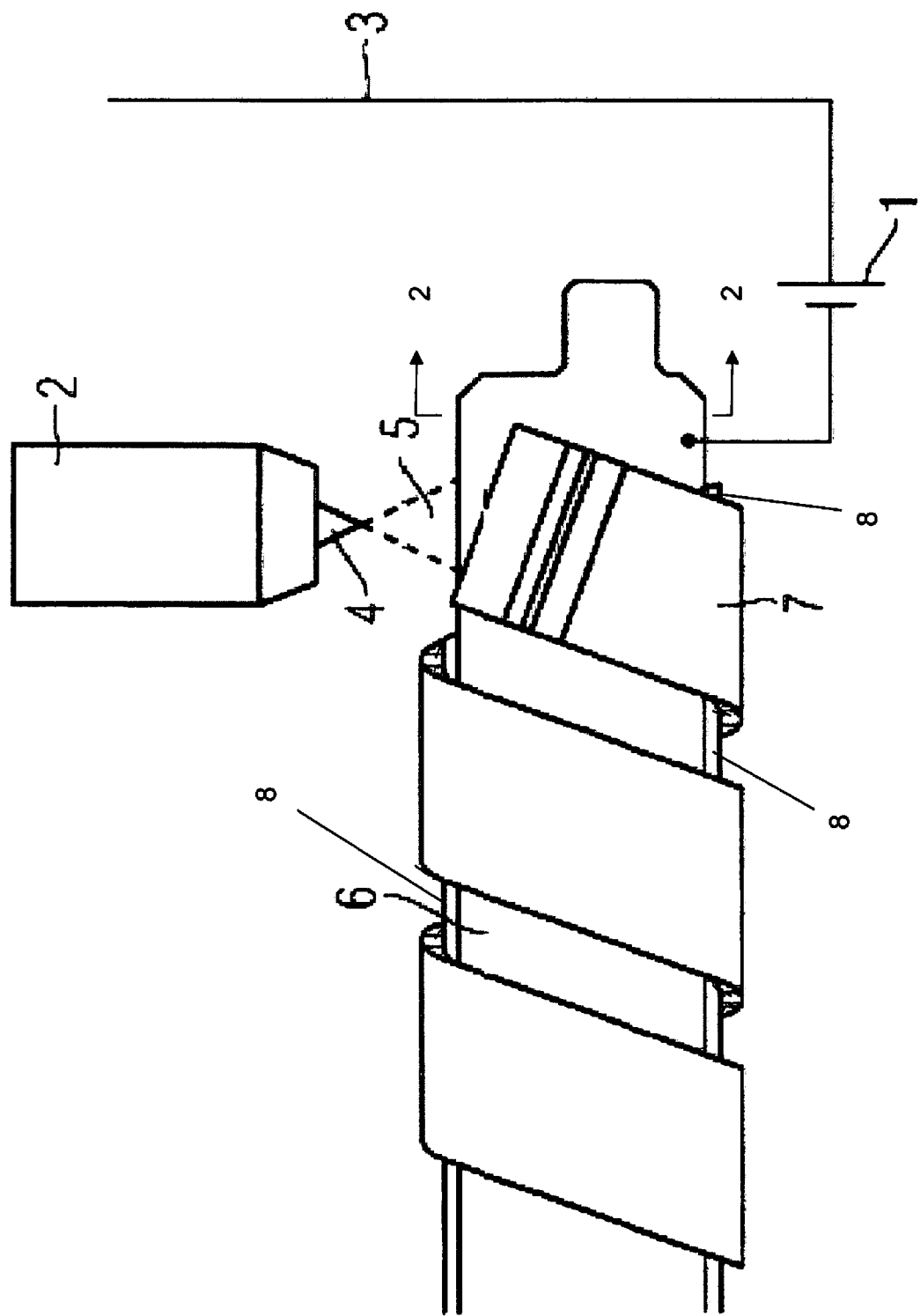
FIG. 1 shows the TIG welding operation according to an embodiment of the invention between a heating conductor and a metal strip of a thermal overload release in a schematic representation.

According to an embodiment of the invention, an overload release, in particular for a circuit breaker, includes a metal strip which is made of at least two different types of metal and around which a heating conductor is wound, wherein an electrical insulator is arranged between the metal strip and the heating conductor. An embodiment of the invention is in this case distinguished by the fact that the heating conductor is welded onto the metal strip by means of arc welding.

The replacement of resistance forge welding by an arc welding method, such as for example tungsten inert-gas welding (TIG), allows many materials that are used in the case of high setting ranges to be connected well. It has been the case for resistance forge welding that material combinations with melting points that are far apart, materials with high electrical and thermal conductivity and materials with varying contact resistances, for example as a result of oxide layers on the surface, are problematic.

TIG welding is much less susceptible to these problems. The process heat is generated here contactlessly by an arc, so that oxides on the surface scarcely cause any trouble. The high temperatures of the arc allow material combinations with melting points that are far apart also to be melted at one and the same time. The electrical and thermal conductivities do not have such a great influence on the welding process in TIG welding as is the case with resistance forge welding.

Furthermore, in the case of high setting ranges, instead of bimetal materials, trimetal materials are primarily used, that is to say the active side and the passive side are separated by a third metal layer. This is usually a layer of copper or a copper alloy. This layer presents additional problems in the case of resistance forge welding. It generally melts at a lower temperature than the two outer metal layers. During welding, however, the melting point of the outer layers is reached. On account of the direct vicinity, the low-melting copper layer is often also melted, which results in undesired welding spatter and the risk of the bimetal strips sticking to the welding electrodes. The process therefore cannot be controlled well.

In particular, the large welded areas between the bimetal and the heating conductor that are required in the case of high setting ranges to ensure the current-carrying capability in the later switching device necessitate great welding currents and power outputs. This leads to relatively strong variations in the process heat that is introduced when there are minor deviations in the contact resistances of the parts to be welded, and this is manifested by varying melt formation.

One advantage here of arc welding methods, such as for example the TIG welding process, is that, as a result of the process, welding spatter scarcely occurs, another advantage is that, end-on TIG welding on the trimetal strip allows the inner copper layer and the heating conductor, usually consisting of copper or a copper material, to be connected directly, which is not possible in the case of resistance forge welding. The low resistances of the copper materials connected in this way has the effect of lowering the internal resistance of the welding in the later switching device. As a result, it is also the case that only smaller welded areas are required for the current-carrying capability, whereby the reliability of the connection is increased. Moreover, it has been possible to show that, with the TIG welding process, 100% of the heating conductor cross section can be welded to the bimetal relatively easily.

Apart from a more stable process, TIG welding consequently also has more favorable electrical properties at the connection produced. The possibility of being able to connect material combinations that could scarcely be welded until now means that a substitution of packeted bimetal strips by wound bimetal strips can be achieved. In this way, a reduction in the production costs can be achieved.

In comparison with other fusion welding methods, the tungsten inert-gas welding method is distinguished by a series of advantages. Together with pulsed TIG welding and TIG AC welding, any material suitable for fusion welding can be joined. In the case of TIG welding, there is virtually no welding spatter. The health risk posed by welding fumes is relatively low.

One particular advantage of TIG welding is that it does not use a consumable electrode. There is therefore no link between the addition of welding filler and the current intensity. The welder can set the welding current optimally to the welding task and only has to add as much welding filler as is precisely required. This makes the method particularly suitable for root pass welding and out-of-position welding. The introduction of a relatively low amount of heat over a small area makes the welding distortion of the workpieces less than in the case of other methods. Because of the high levels of quality of the welds, the TIG method is used with preference wherever welding speeds are less important than quality requirements.

The TIG welding unit consists of a current source, which in most cases can be switched to DC welding or AC welding, and a welding torch, which is connected to the current source through a hose pack. In the hose pack are the welding power leads, the inert gas feeds, the control lead and, in the case of relatively large torches, the supply and return of the cooling water.

There are two ways of igniting the arc, contact ignition and high-frequency ignition. In the case of contact ignition (scrape ignition or scratch-start ignition), in a way similar to the electrode gaps the tungsten electrode is briefly stroked against the workpiece like a matchstick and in this way a short-circuit is produced. After lifting the electrode off the workpiece, the arc burns between the tungsten electrode and the workpiece. There is the possibility that, with each ignition some material is left hanging from the tungsten electrode, which because of the higher melting temperatures of the tungsten is left behind in the molten bath as a foreign body. Therefore, a separate copper plate, lying on the workpiece, is often used for the ignition.

High-frequency ignition has almost completely replaced scrape ignition. In the case of high-frequency ignition, a high-voltage pulse generator, which applies a high voltage to the tungsten electrode, is used to ionize the gas between the electrode and the workpiece, whereby the arc is ignited. The high-voltage pulse generator has a safe current intensity.

A variant of contact ignition is lift-arc ignition. The electrode is placed directly against the welding location on the workpiece. A smaller current flows, insufficient to damage the electrode. When the torch is lifted off, the plasma arc ignites and the electronics of the welding machine increase the current to welding current intensity. The advantage of this method is the avoidance of electromagnetic interferences that can occur in the case of high-frequency ignition.

Usually the noble gas argon is used for the welding, less often helium or a mixture of the two gases. In this way, the relatively expensive helium is used because of its better thermal conductivity to increase the introduction of heat. The inert gas is conducted through the gas nozzle to the welding location. In the case of TIG welding, it is possible to work both with and without a filler. For manual welding, as in the case of gas fusion welding, usually fillers in the form of rods are used. However, it is essential to avoid mixups with the gas welding rods, since the chemical compositions differ from one another.

In the case of TIG welding, a distinction is drawn between DC welding and AC welding. DC welding with a negatively polarized electrode is used for welding steels of all types and their alloys. By contrast, AC welding is used primarily for welding the light metals aluminum and magnesium. In special cases, light metals are also welded with direct current and with a positive electrode. In those cases, special welding torches with a very thick tungsten electrode and helium as the inert gas are used.

The positive polarity of the tungsten electrode is important in the case of light metals, since they usually form on their surface a hard oxide layer with a very high melting point, as in the case of aluminum oxide or magnesium oxide. With a negative polarity of the workpiece, this oxide layer is broken up, since the workpiece then acts as an electron-emitting pole and negative oxygen ions are carried away.

A further development of TIG welding is welding with a pulsating current. In this case, the welding current pulsates between a background current and a pulsating current with variable frequencies, background- and pulsating-current levels and widths. The pulse repetition frequency, the pulse width and the pulse height can be set separately from one another. TIG pulsing with a variable current profile can only be carried out with a special welding unit (welding inverter). The finely adjustable introduction of heat in the case of TIG pulse welding allows good gap bridging, good root welding and good out-of-position welding. Weld zones at the beginning of the weld and the end of the weld as in the case of pipe welding are avoided.

An embodiment of the invention is distinguished by the fact that the principle of resistance heating is replaced by the principle of contactless melting by an electric arc when connecting the heating conductor and the bimetal by way of welding. The advantages of a TIG welded connection between the heating conductor and bimetals is that weldability of previously scarcely weldable material combinations is possible and a more stable welding process is used. Moreover, there are improved electrical properties at the welded connection. Furthermore, the production costs for protective devices with thermal releases in high setting ranges are reduced by the automatability and the reduction in the amount of material used.

In FIG. 1, the setup of a TIG welding unit is represented. The TIG welding unit has a current source 1, which in most cases can be switched to DC welding or AC welding, and a welding torch 2, which is connected to the current source 1 by a hose pack 3. In the hose pack 3 are the welding current conductor, the inert gas feed, the control lead and, in the case of relatively large torches, the supply and return of the cooling water. Arranged on the welding torch 2 is a tungsten electrode 4, at which an arc 5 is produced. The arc 5 strikes the two parts to be welded, which include a metal strip 6 and a heating conductor 7. Electrical insulator 8 is arranged between the metal strip 6 and the heating conductor. As disclosed above, trimetal materials are primarily used. That is to say an active side 20a and a passive side 20b are separated by a third metal layer 20c. In this TIG welding, spatter scarcely occurs, and large connected cross sections are achieved.

An embodiment of the invention is distinguished by the fact that the principle of resistance heating is replaced by the principle of contactless melting by an electric arc when connecting the heating conductor and the bimetal via welding. The advantages of a TIG welded connection between the heating conductor and bimetals is that weldability of previously scarcely weldable material combinations is possible and a more stable welding process is used. Moreover, there are improved electrical properties at the welded connection. Furthermore, the production costs for protective devices with thermal releases in high setting ranges are reduced by the automatability and the reduction in the amount of material used.

The invention claimed is:

1. An overload release, comprising:
   a metal strip, including at least two different types of metal;
   a heating conductor, wound around the metal strip and welded onto the metal strip; and
   an electrical insulator, arranged between the metal strip and the heating conductor,
   wherein substantially an entire end surface of the heating conductor is welded to the metal strip through an arc weld, the end surface being a transverse surface intersecting a longitudinal surface and a lateral surface of the heating conductor.

2. The overload release of claim 1, wherein the electrical insulator is a glass-fiber fabric.

3. The overload release of claim 1, wherein the metal strip is a trimetal strip.

4. The overload release of claim 3, wherein the trimetal strip includes a first metal layer, a second metal layer and a third metal layer, wherein the third metal layer is a copper or a copper alloy as the third metal layer.

5. The overload release of claim 1, wherein the weld is a tungsten inert-gas (TIG) weld.

6. A method for producing an overload release including a metal strip, the metal strip including at least two different types of metal and a heating conductor being wound around the metal strip, and an electrical insulator arranged between the metal strip and the heating conductor, the method comprising:
   welding, substantially, an entire end surface of the heating conductor onto the metal strip by end-on contactless tungsten inert-gas welding arc (TIG welding), the end surface being a transverse surface intersecting a longitudinal surface and a lateral surface of the heating conductor.

7. The overload release of claim 1, wherein the overload release is a circuit breaker.

8. The overload release of claim 2, wherein the metal strip is a trimetal strip.

9. The overload release of claim 8, wherein the trimetal strip includes a first metal layer, a second metal layer and a third metal layer, wherein the third metal layer is a copper or a copper alloy.

10. The method for producing an overload release of claim 6, wherein the overload release is a circuit breaker.

11. A method for producing an overload release, comprising:
    winding a heating conductor around a metal strip and an electrical insulator so that the electrical insulator is arranged between windings of the heating conductor and the metal strip, the metal strip including at least two different types of metal; and
    welding, substantially, an entire end surface of the heating conductor onto the metal strip using a welding process that uses an arc to weld the heating conductor onto the metal strip without exerting additional resistance forge welding at a welding point, the end surface being a transverse surface intersecting a longitudinal surface and a lateral surface of the heating conductor.

12. The method for producing an overload release of claim 11, wherein the welding process is tungsten inert-gas (TIG) welding.

13. The overload release of claim 1, wherein an entire cross-section of the heating conductor is welded onto the metal strip.

14. A method for producing an overload release having:
a metal strip including at least two different types of metal;
a heating conductor wound around the metal strip; and
an electrical insulator arranged between the metal strip and the heating conductor, the method comprising:
welding an entire end surface of the heating conductor onto the metal strip by an end-on arc tungsten inert-gas weld (TIG weld), the end surface being a transverse surface intersecting a longitudinal surface and a lateral surface of the heating conductor.

* * * * *